United States Patent [19]
Kass et al.

[11] Patent Number: 5,562,298
[45] Date of Patent: Oct. 8, 1996

[54] WEIGHT DISTRIBUTING HITCH ASSEMBLY

[75] Inventors: John J. Kass, Granger, Ind.; Philip K. Hoopes, Union, Mich.

[73] Assignee: Reese Products, Inc., Elkhart, Ind.

[21] Appl. No.: 319,908

[22] Filed: Oct. 7, 1994

[51] Int. Cl.⁶ ........................................................ B60D 1/06
[52] U.S. Cl. .................................. 280/406.2; 280/406.1; 280/457; 280/504
[58] Field of Search .................... 280/406.2, 406.1, 280/405.1, 407, 455.1, 456.1, 457, 460.1, 475, 491.1, 491.4, 504, 507, 511, 514

[56] References Cited

U.S. PATENT DOCUMENTS

| | | | |
|---|---|---|---|
| 2,952,475 | 9/1960 | Reese | 280/406.2 |
| 3,185,499 | 5/1965 | Reese | 280/406.2 |
| 3,220,749 | 11/1965 | Mathisen | 280/406.2 |
| 3,420,549 | 1/1969 | Robinson | 280/477 |
| 3,441,291 | 4/1969 | Morris, Jr. | 280/406.2 |
| 3,482,856 | 12/1969 | Reese | 280/406.2 |
| 3,600,004 | 8/1971 | Newkirk | 280/406.2 X |
| 3,649,046 | 3/1972 | Mathisen | 280/406.2 |
| 3,679,231 | 7/1972 | Derr, Jr. | 280/406.2 |
| 3,731,950 | 5/1973 | Burcham | 280/406.2 |
| 3,787,069 | 1/1974 | Chauncey | 280/486 |
| 4,092,035 | 5/1978 | Warner | 280/446.1 |
| 4,405,147 | 9/1983 | Horsman et al. | 280/443 |

*Primary Examiner*—Brian L. Johnson
*Assistant Examiner*—F. Zeender
*Attorney, Agent, or Firm*—King and Schickli

[57] ABSTRACT

A weight distributing hitch for towing a trailer includes a hitch bar, a ball mount head and spring bars for distributing the weight of the trailer relative to a towing vehicle. The spring bars include mounting trunnions and the ball mount head includes cooperating sockets for receiving those mounting trunnions. The spring bars are installed in the ball mount head by inserting a first end of the mounting trunnion in a first cooperating mounting socket, passing a second end of the mounting trunnion through a channel communicating with a second cooperating mounting socket and engaging the second end of the trunnion in the second cooperating mounting socket.

4 Claims, 3 Drawing Sheets

WEIGHT DISTRIBUTING HITCH ASSEMBLY

TECHNICAL FIELD

The present invention relates generally to the towing field and, more particularly, to a new and improved weight distributing hitch assembly and a method of installing spring bars in a ball mount head of such an assembly.

BACKGROUND OF THE INVENTION

Hitch assemblies for evenly distributing the tongue weight of a trailer over the front and rear wheels of a towing vehicle are well known in the art. A particularly advanced design of weight distributing hitch assembly is disclosed in the assignee's patent application, Ser. No. 08/138,172, filed Oct. 15, 1993 and entitled Weight Distributing Hitch and now U.S. Pat. No. 5,375,867. This hitch assembly includes a hitch bar for mounting to the vehicle and a ball mount head for mounting on the hitch bar at a selected tilt angle. A pair of spring bars are mounted to the ball mount head. These spring bars distribute the weight of the trailer relative to the vehicle. Each spring bar is substantially L-shaped and includes a turned groove at a proximal end that is received in a cooperating aperture in the ball mount head. A retainer of spring steel engages in the grooves to hold the spring bars in position.

While the spring bar retainer in this design is secured to the ball mount head so that it will not be lost or misplaced, the retainer is still present near the area where the trailer tongue and coupler must be positioned over the hitch ball. This creates the potential for the retainer becoming inadvertently engaged by the heavy trailer and being bent or otherwise damaged during the trailer connection operation. Accordingly, it is desirable to eliminate the need for any separate spring bar retainer component to secure the spring bars in position. Thus, a need is identified for a weight distributing hitch assembly of improved design that eliminates the need for a separate retaining component for the spring bars.

SUMMARY OF THE INVENTION

Accordingly, it is a primary object of the present invention to provide a weight distributing hitch assembly of improved design especially adapted for towing a trailer behind a vehicle.

Another object of the present invention is to provide a weight distributing hitch assembly incorporating a unique mounting system wherein the spring bars and ball mount head cooperate to allow simple, carefree and convenient installation of the spring bars and reliable retention without the need of a separate retaining pin or other component.

Yet another object of the present invention is to provide a ball mount head with cooperating sockets designed to receive trunnion-mounted spring bars in a user-friendly fashion while also providing a more aesthetically pleasing configuration.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved weight distributing hitch assembly is provided for towing a trailer behind a vehicle. The weight distributing hitch assembly includes a hitch bar of a type known in the art for mounting to the towing vehicle. More specifically, the hitch bar includes a mounting post that is received in the receiver box of a hitch receiver of a type known in the art that is secured to the frame of a towing vehicle in a known manner.

The weight distributing hitch assembly also includes a ball mount head for mounting on the distal or head-receiving end of the hitch bar at a selected tilt angle. Further, spring bar means in the form of a pair of spring bars are received in cooperating sockets in the ball mount head. As is known in the art and described in greater detail below, these spring bars are particularly adapted for distributing the tow weight of the trailer relative to the front and rear wheels of the towing vehicle.

Additionally, in accordance with an important aspect of the present invention, each of the spring bars includes a mounting trunnion at its distal end. Each of the mounting trunnions includes oppositely disposed and outwardly projecting pivot pins that are received in a pair of spaced, substantially aligned sockets adapted to mount the spring bars in the ball mount head.

Still more specifically, the ball mount head includes a pair of spaced, substantially parallel first and second platforms mounted to a U-shaped mounting bracket. The substantially aligned sockets into which each spring bar is mounted are formed in these platforms. The first of the sockets is substantially circular in outline and is formed in the second or lower platform. The second of the sockets is substantially oblong in outline and is formed in the first or upper platform.

Preferably, the second of the sockets has a sidewall and one closed endwall. The closed endwall is at the upper face of the upper platform and, accordingly, a smooth aesthetically pleasing surface is presented across the visible upper face of the ball mount head. Further, no retaining elements or components project upwardly into the area around the hitch ball where they could interfere with the trailer connection process.

A channel is also formed in the first platform. Specifically, the channel is formed in the lower face of the first, upper platform and extends through the sidewall of the second socket so as to be in communication with the second socket. Advantageously, as will be described in greater detail below, this channel provides clearance for engaging the mounting trunnion of the spring bar in the cooperating sockets.

More specifically, a spring bar is initially positioned for installation in the ball mount head by inserting a first end or pivot pin of the trunnion of the spring bar into the first cooperating mounting socket formed in the lower platform of the ball mount head. The spring bar and mounting trunnion are then canted slightly to allow the passing of a second end or pivot pin of the mounting trunnion through the channel which communicates with the second cooperating mounting socket on the ball mount head. The spring bar and mounting trunnion are then twisted so as to allow the engaging of the second end of the mounting trunnion in the second cooperating mounting socket.

Once the spring bar mounting trunnion is engaged in the cooperating sockets, the spring bar is retained in proper position by engagement of the opposed pivot pins of the mounting trunnion with the sidewalls of the cooperating sockets. Advantageously, there is no need to provide or utilize a separate retaining pin or other means as utilized in prior art weight distributing hitch designs to retain the spring bars in position. Since such retaining pins, clips or other devices are prone to be lost or misplaced, and often become damaged in use, this represents a significant advantage provided by the weight distributing hitch of the present invention. Further, it should be appreciated that when mounted in proper position, the upper, closed end of the second socket insures a neat and orderly appearance that is very satisfactory to a trailer owner. Further, it should also be appreciated that the installation of the spring bars is simplified. The procedure of canting and twisting each spring bar into the engaged position is a natural, smooth motion when following the channel which effectively functions as a guide. Further, the difficulty of attempting to hold the spring bar in position while inserting a connecting pin or other retaining device is removed. Thus, this frustrating step required in prior art weight distributing hitch designs is eliminated.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
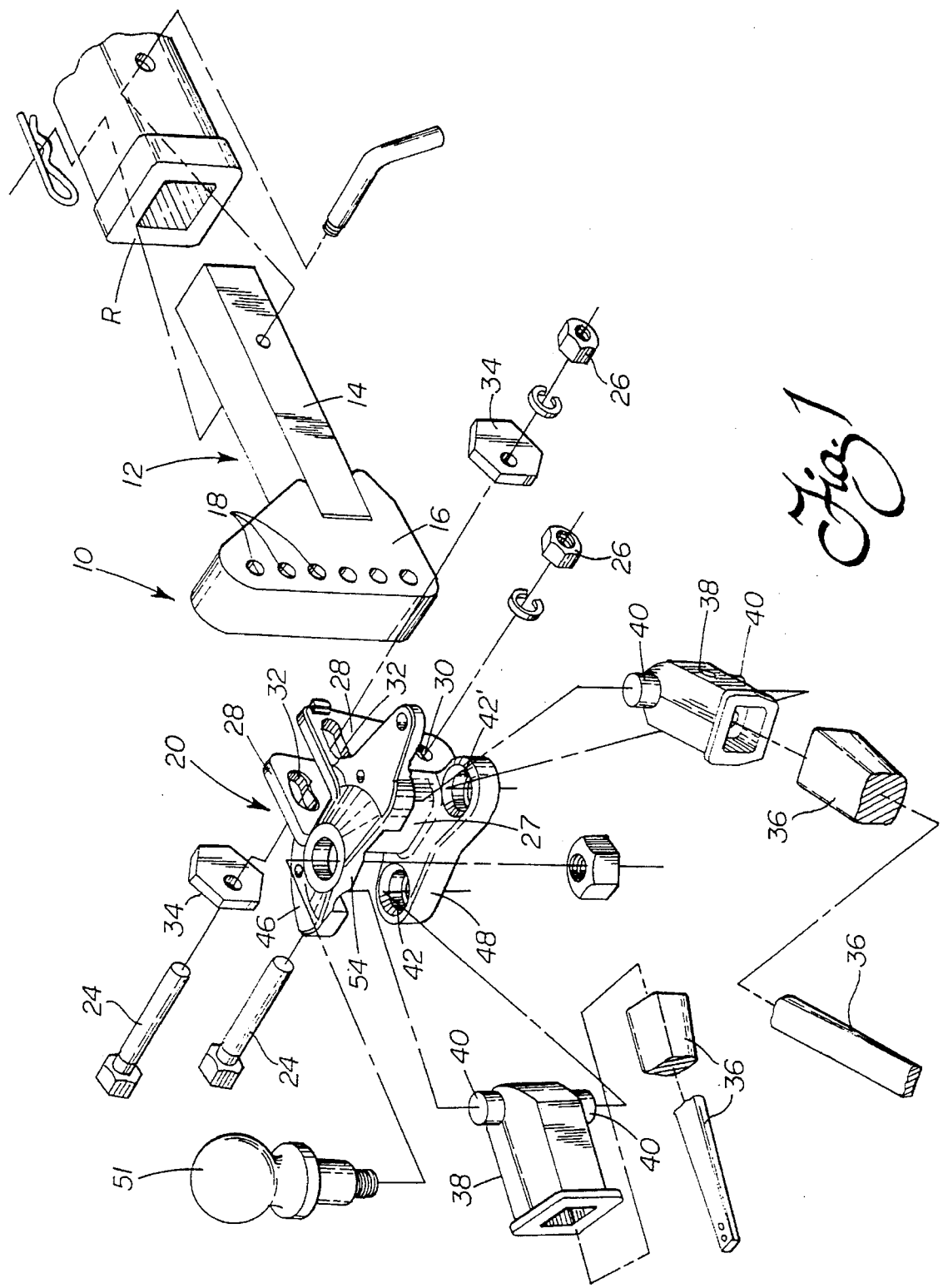
FIG. 1 is an exploded perspective view of the ball mount head and hitch bar of the weight distributing hitch assembly of the present invention.

Reference is now made to FIG. 1 showing the weight distributing hitch assembly 10 of the present invention. As should be appreciated, the hitch assembly 10 includes a hitch bar 12 of a type known in the art including a tubular mounting post 14 for engagement in a receiver box R of a hitch receiver mounted to a vehicle (not shown). Such a hitch receiver is, for example, a Class III or Class IV Series 35000 and 36000 hitch receiver as manufactured by Reese Products, Inc. of Elkhart, Id., the assignee of the present invention.

The distal end of the hitch bar 12 includes a mounting rack 16 having a series of apertures 18 allowing for height adjustment of the ball mount head 20. The ball mount head 20 may be a one-piece, integral construction cast from ductile iron. The ball mount head 20 is secured to the mounting rack 16 of the hitch bar 12 by means of two cooperating fasteners shown as bolts 24 and cooperating nuts 26.

It should be further appreciated that the ball mount head 20 includes a substantially U-shaped mounting bracket 27 having a pair of spaced, parallel mounting flanges 28 so as to form a yoke adapted to receive the mounting rack 16. When properly mounted the lower bolt 24 extends through the aligned cooperating apertures 30 (only one visible in FIG. 1) in the mounting flanges 28 and the one aligned aperture 18 in the interdisposed mounting rack 16. Similarly, upper bolt 24 extends through aligned cooperating arcuate slots 32 in the mounting flanges 28 and through the aligned aperture 18 in the interdisposed mounting rack 16. The arcuate slots allow the ball mount head 20 to be pivoted relative to the hitch bar 12 about the lower bolt 24.

The resulting tilt angle of the ball mount head 20 may be selected by manipulation of the indexable, eccentric washer 34 in a manner described in detail in co-pending U.S. patent application Ser. No. 08/138,172, the full disclosure of which is incorporated herein by reference. As is known in the art, the adjustment of the tilt angle allows one to tune the weight distributing characteristics of the hitch assembly 10 so as to allow the trailer tongue weight to be evenly distributed over the front and rear wheels of the towing vehicle.

Figure 4:
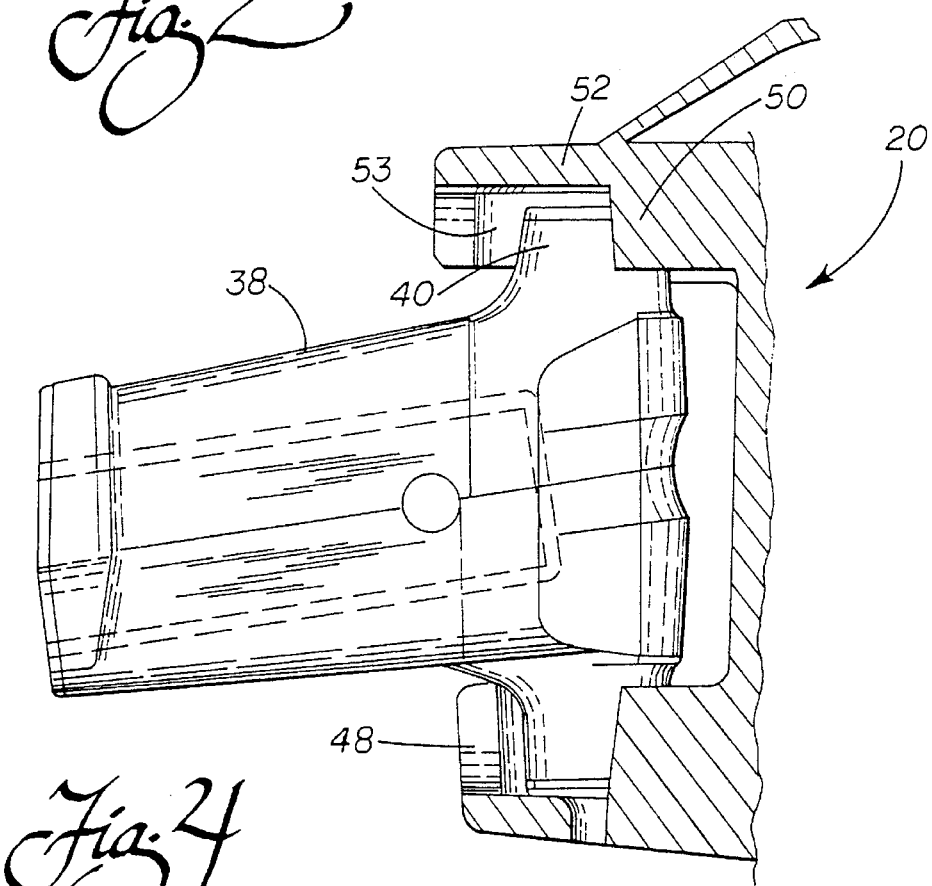
FIG. 4 is a cross sectional view showing one spring bar trunnion fully engaged in the sockets of the ball mount head.

As also shown in FIG. 1, the weight distributing hitch assembly 10 includes a pair of spring bars 36. Each spring bar 36 includes a trunnion 38 at its proximal end for mounting in the ball mount head 20. More specifically, each mounting trunnion 38 includes a pair of oppositely disposed and outwardly projecting pivot pins 40. As described in greater detail below, the pivot pins 40 on the trunnion 38 of the first spring bar 36 are received in a first set of cooperating sockets 42, 44 in the ball mount head 20 while the pivot pins 40 on the trunnion 38 of the second spring bar 36 are received in a second set of cooperating sockets 42', 44' also in the ball mount head (see also FIGS. 2–4).

As further shown in FIG. 1, the ball mount head 20 includes spaced, substantially parallel first and second platforms 46, 48, respectively, that may be integrally cast with the mounting bracket 27. The first socket 42, 42' of each set of sockets is substantially circular in outline and formed in the lower or second platform 48. The second socket 44, 44' of each set of sockets is substantially oblong in outline and formed in the (lower) face 49 of the upper or first platform 46; that is, the face directed toward the second platform 48 (see also FIG. 2).

Figure 2:
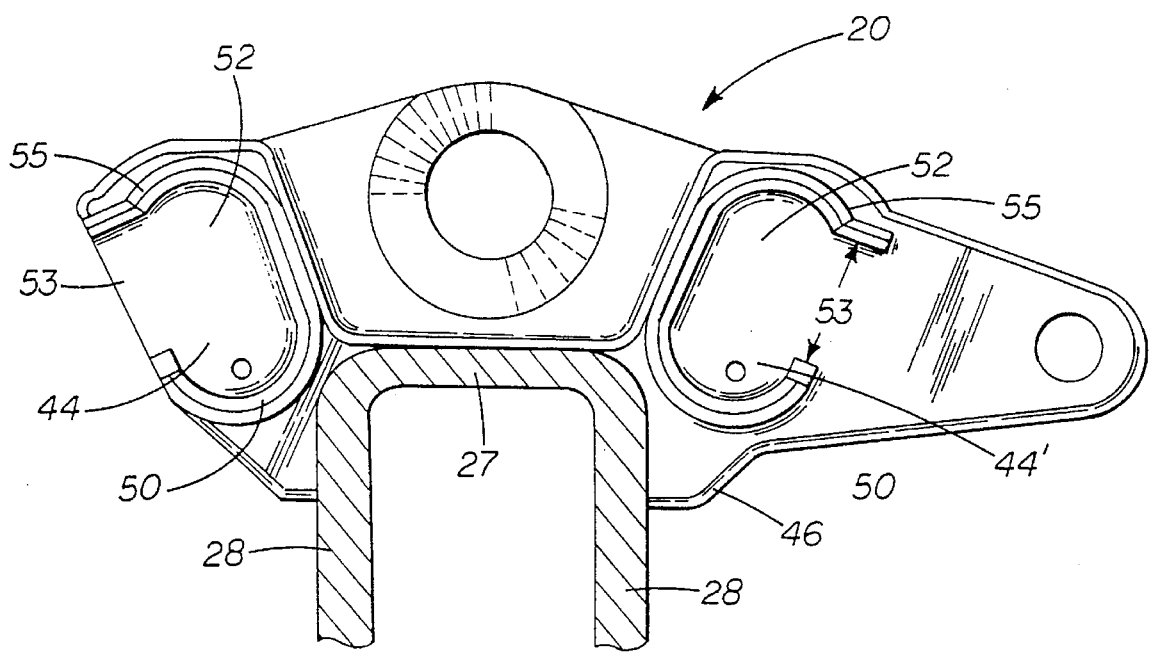
FIG. 2 is a partially sectional bottom plan view of the first or upper platform of the ball mount head of the present invention showing oblong sockets for receiving connecting pins of the mounting trunnions of the spring bars.
Figure 3:
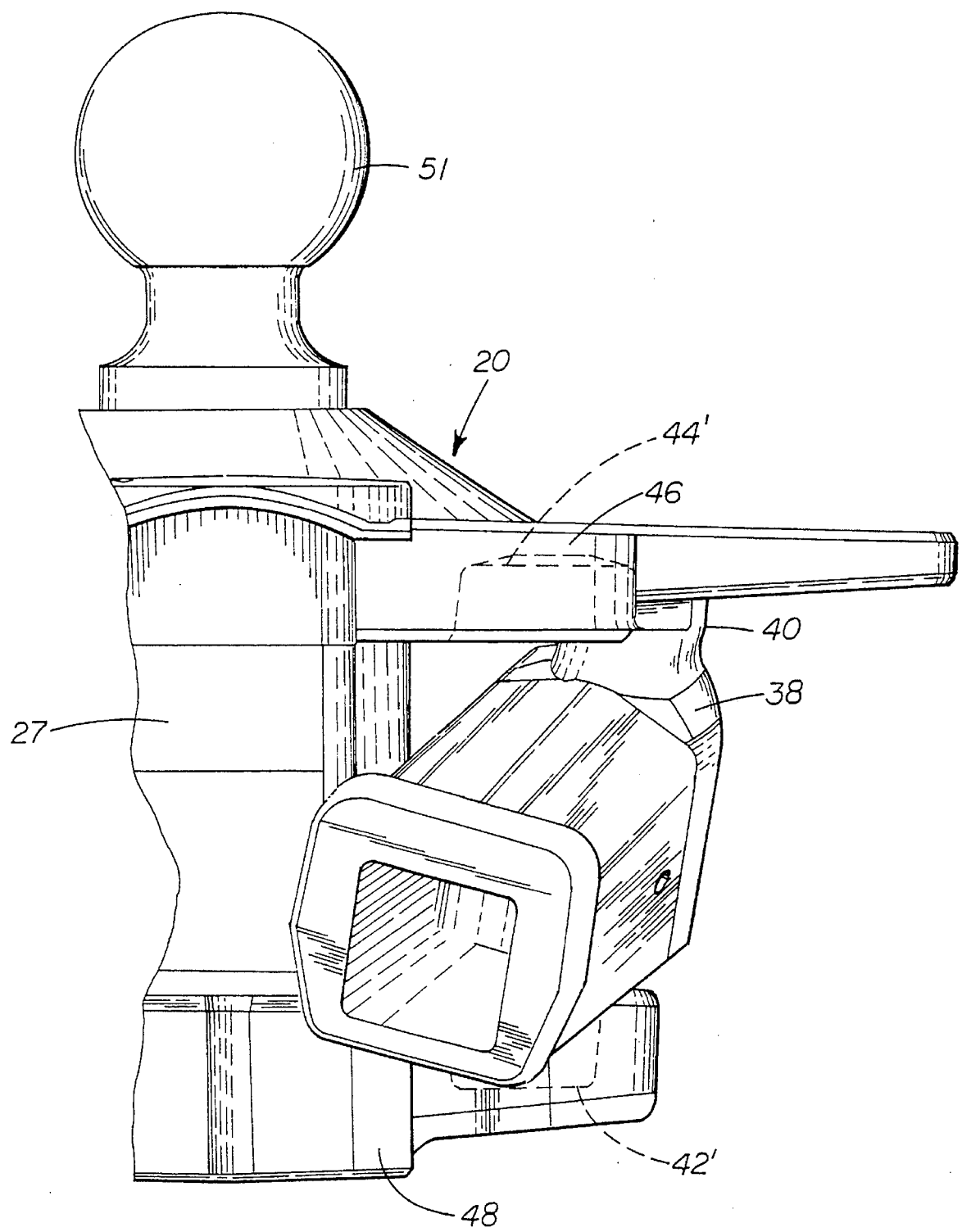
FIG. 3 is a cutaway front elevational view illustrating the method of installing a spring bar mounting trunnion in the ball mount head of the weight distributing hitch assembly of the present invention.

As should be further appreciated from reviewing FIG. 2, the second sockets 44, 44' each include a sidewall 50 and a closed end wall 52 (i.e. the sockets 44, 44' do not extend through the upper face of the first platform 46). Thus, the upper face of the first platform 46 presents a clean, smooth and uninterrupted surface that is very pleasing to the eye when compared to prior art designs wherein an end of the hitch bar passes through an opening and extends above this surface. Further, as the spring bars 36 and their trunnions 38 do not extend through or above the platform 46, there is nothing to interfere with coupling in the area of the hitch ball 51.

A channel 53 is also formed in the lower face 49 of the first platform 46. This channel 53 extends from the along the face 49 of the first platform 46 through the sidewall 50 of each socket 44, 44' so as to be in communication with the sockets. The channel 53 functions to provide the necessary clearance for engaging the mounting trunnions 38 of the spring bars 36 in their respective cooperating socket sets 42, 44 and 42', 44'.

More specifically, a spring bar 36 is installed in the ball mount head 20 of the hitch assembly 10 by inserting a first end or pivot pin 40 of the mounting trunnion 38 in the first socket 42. The spring bar 36 is then manipulated so as to be canted slightly (top end tilted away from the center of ball mount head 20) for passing the second end or opposite pivot pin 40 through the channel 53. Next, the spring bar 36 is twisted so that the pivot pin 40 follows the channel 53, passing the sidewall 50 and engaging in the second cooperating mounting socket 44. As should be appreciated the closed rearward section of the sidewall 50 insures that the spring bar is retained in the proper position fully engaged in the sockets 42, 44 of the ball mount head 20. More specifically, the rear portion of the sidewall 50 provides a seat for the pivot pin 40 extending a full 180° there around. Of course, the rearwardly curved lip 55 at the front portion of the sidewall 50 also prevents the pivot pin 40 from passing through the channel 53 and falling out of the ball mount head 20 in the event that the free-hanging weight of the spring bar 36 causes the spring bar to rock forward prior to connection to the trailer. The other spring bar 36 is then inserted in the sockets 42', 44' in the same manner but by canting and twisting in the opposite direction.

The installation procedure is very simple and straightforward. The retention is advantageously achieved without the use of any retaining pin, clip or other component of the type used in prior art designs. Thus, there is no struggling to hold the spring bar in position while a retaining pin or clip is inserted. Further, as such retaining pins are easily lost or misplaced and are often constructed from lightweight material thereby providing only a limited service life, this "built-in" retention feature is a convenience luxury. Of course, once the spring bars 36 are placed under load by connection through chains to lift units on the trailer frame (not shown) in a manner known in the art, the pivot pins 40 are even more securely held in the sockets 42, 44 and 42', 44'. This is accomplished through the frictional engagement of the pivot pins 40 with the 180°-extending rear portion of the sidewall 50 of the second sockets 44, 44'. The channel 53 through the sidewall 50 is presented at an angle substantially perpendicular to the axis of loading of the spring bars 36 to further insure the integrity of the connection.

In summary, numerous benefits result from employing the concepts of the present invention. A weight distributing hitch 10 is provided with smooth, aesthetic lines and a clean, open area adjacent the hitch ball 51 carried on the ball mount head 20. The spring bars 36 are also very easy to install and, as an added advantage, are maintained in position without the need of utilizing a separate retainer.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A weight distributing hitch assembly for towing a trailer behind a vehicle, comprising:

a hitch bar for mounting to the vehicle;

a ball mount head for mounting on said hitch bar; and spring bar means for distributing weight of the trailer relative to the vehicle;

said weight distributing hitch assembly being characterized by:

said spring bar means including a mounting trunnion;

said ball mount head including socket means for receiving and holding said spring bar means by said mounting trunnion, said socket means including a pair of spaced, substantially aligned sockets, a first of said sockets being circular in outline and a second of said sockets being substantially C-shaped;

said second C-shaped socket having a sidewall and a channel extending through said sidewall so as to be in communication with said second of said sockets whereby clearance is provided for engaging said mounting trunnion of said spring bar means in said cooperating socket; and said sidewall further including a rearward portion having a forwardly directed lip that engages said mounting trunnion and prevents said mounting trunnion from freely passing through said channel when said spring bar means hang freely from said ball mount head in a substantially rearward direction.

2. The weight distributing hitch assembly set forth in claim 1, wherein said mounting trunnion includes oppositely disposed pivot pins.

3. The weight distributing hitch assembly set forth in claim 1, wherein said ball mount head includes spaced substantially parallel first and second platforms mounted to a mounting bracket.

4. The weight distributing hitch assembly set forth in claim 3, wherein said second of said sockets has one closed end wall.

* * * * *